United States Patent
Lorenz et al.

(10) Patent No.: US 7,587,564 B2
(45) Date of Patent: Sep. 8, 2009

(54) SYSTEM, METHOD AND COMPUTER PROGRAM PRODUCT FOR MANAGING DATA VERSIONS

(75) Inventors: Dean Har'el Lorenz, Haifa (IL); Shlomit Sarah Pinter, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 11/535,094

(22) Filed: Sep. 26, 2006

(65) Prior Publication Data

US 2008/0077629 A1    Mar. 27, 2008

(51) Int. Cl.
    G06F 7/36    (2006.01)
(52) U.S. Cl. .................... 711/162; 707/203
(58) Field of Classification Search ............ 711/162; 707/203, 204
    See application file for complete search history.

(56) References Cited

U.S. PATENT DOCUMENTS

| | | | |
|---|---|---|---|
| 6,611,901 B1 | 8/2003 | Micka et al. | |
| 7,000,145 B2 | 2/2006 | Werner et al. | |
| 7,203,814 B2* | 4/2007 | Serizawa et al. | 711/202 |
| 2003/0187887 A1 | 10/2003 | Beal | |
| 2004/0030951 A1* | 2/2004 | Armangau | 714/6 |
| 2004/0139125 A1* | 7/2004 | Strassburg et al. | 707/202 |
| 2004/0268068 A1 | 12/2004 | Curran et al. | |
| 2005/0063374 A1 | 3/2005 | Rowan et al. | |
| 2005/0065962 A1 | 3/2005 | Rowan et al. | |
| 2005/0066118 A1 | 3/2005 | Perry et al. | |
| 2005/0066222 A1 | 3/2005 | Rowan et al. | |
| 2005/0066225 A1 | 3/2005 | Rowan et al. | |
| 2005/0071379 A1 | 3/2005 | Kekre et al. | |
| 2005/0076261 A1 | 4/2005 | Rowan et al. | |
| 2005/0076262 A1 | 4/2005 | Rowan et al. | |
| 2005/0076264 A1 | 4/2005 | Rowan et al. | |
| 2005/0187992 A1 | 8/2005 | Prahlad et al. | |

(Continued)

FOREIGN PATENT DOCUMENTS

WO    WO04114136 A2    12/2004

OTHER PUBLICATIONS

Soules, C.A.N. et al., "Metadata efficiency in versioning file systems", *Proceedings of the 2nd USENIX Conference on File and Storage Technologies (FAST'03)*, 2003, p. 43-58.

*Primary Examiner*—Matt Kim
*Assistant Examiner*—Hal Schnee

(57) ABSTRACT

A method, device and computer program product for managing data versions. The method includes: (i) receiving a first request to generate a first version of a source volume; (ii) selectively updating a first control data structure that is indicative of changes of blocks of data associated with different versions of the source volume, in response to the first request, to reflect at least one latest modified block of data that was modified between a first point in time associated with the first version and between second point in time associated with a second version of the first source volume; wherein information representative of different versions of the source volume are stored in a target storage unit; and wherein blocks of data that remain unchanged between multiple versions of the source volume are shared between these multiple versions; wherein the first point in time follows the second point in time and wherein the at least one block data belongs to the volume; and (iii) selectively copying blocks of data from the source volume to the target volume in response to the content of the first control data structure.

27 Claims, 5 Drawing Sheets

U.S. PATENT DOCUMENTS

| | | |
|---|---|---|
| 2005/0193038 A1 * | 9/2005 | Pearson et al. .............. 707/203 |
| 2005/0193272 A1 | 9/2005 | Stager et al. |
| 2005/0223271 A1 | 10/2005 | Butterworth |
| 2006/0174074 A1 * | 8/2006 | Banikazemi et al. ........ 711/162 |
| 2007/0300037 A1 * | 12/2007 | Rogers et al. ............... 711/202 |

* cited by examiner

SYSTEM, METHOD AND COMPUTER PROGRAM PRODUCT FOR MANAGING DATA VERSIONS

FIELD OF THE INVENTION

The present invention relates to methods, systems and computer program products for managing data versions.

BACKGROUND OF THE INVENTION

Data can evolve over time. Various methods and systems were developed for managing time evolving data. The following U.S. patent applications and U.S. patents, all being incorporated herein by reference, describe various methods for managing data: U.S. patent application publication serial number 2005/0066118 of Perry et al., and U.S. patent application publication serial number 2005/0193272 of Stager et al.; U.S. patent application publication serial number 2005/0066222 of Rowan et al., U.S. patent application publication serial number 2005/0076262 of Rowan et al., U.S. patent application publication serial number 2005/0065962 of Rowan et al.; U.S. patent application publication serial number 2005/0063374 of Rowan et al.; U.S. patent application publication serial number 2005/0076264 of Rowan et al.; U.S. patent application publication serial number 2005/0066225 of Rowan et al.; U.S. patent application publication serial number 2005/0076261 of Rowan et al.; U.S. patent application publication serial number 2005/0066118 of Perry et al., and U.S. patent application publication serial number 2005/0071379 of Kekre et al.

Management of time evolving data can include making copies of data at different point in time. A point-in-time copy can involve physically copying all the data from source volumes to target volumes so that the target volume has a copy of the data as of a point-in-time. A point-in-time copy (also referred to as version) can also be made by logically making a copy of the data and then only copying data over when necessary, in effect deferring the physical copying. This logical copy operation is performed to minimize the time during which the target and source volumes are inaccessible.

A number of direct access storage device (DASD) subsystems are capable of performing "instant virtual copy" operations, also referred to as "fast replicate functions." Instant virtual copy operations work by modifying metadata such as relationship tables or pointers to treat a source data object as both the original and copy. In response to a host's copy request, the storage subsystem immediately reports creation of the copy without having made any physical copy of the data. Only a "virtual" copy has been created, and the absence of an additional physical copy is completely unknown to the host.

Later, when the storage system receives updates to the original or copy, the updates are stored separately and cross-referenced to the updated data object only. The initial benefit is that the instant virtual copy occurs almost instantaneously, completing much faster than a normal physical copy operation. This frees the host and storage subsystem to perform other tasks. The host or storage subsystem may even proceed to create an actual, physical copy of the original data object during background processing, or at another time.

One such instant virtual copy operation is known as a FlashCopy® operation (FlashCopy is a registered trademark of International Business Machines, Corp. or "IBM"). A FlashCopy® operation involves establishing a logical point-in-time relationship between source and target volumes on the same or different devices. The FlashCopy® operation guarantees that until a track in a FlashCopy® relationship has been hardened to its location on the target disk, the track resides on the source side.

A relationship table is used to maintain information on all existing FlashCopy® relationships in the subsystem. During the establish phase of a FlashCopy® relationship, one entry is recorded in the source and target relationship tables for the source and target that participate in the FlashCopy® being established. Each added entry maintains all the required information concerning the FlashCopy® relationship. Both entries for the relationship are removed from the relationship tables when all FlashCopy® tracks from the source extent have been physically copied to the target extents or when a withdraw command is received. In certain cases, even though all tracks have been copied from the source extent to the target extent, the relationship persists.

The target relationship table further includes a bitmap that identifies which tracks involved in the FlashCopy® relationship have not yet been copied over and are thus protected tracks. Each track in the target device is represented by one bit in the bitmap. The target bit is set when the corresponding track is established as a target track of a FlashCopy® relationship. The target bit is reset when the corresponding track has been copied from the source location and destaged to the target device due to writes on the source or the target device, or a background copy task.

As part of the establishment of the logical point-in-time relationship during the FlashCopy® operation, all tracks in the source cache that are included in the FlashCopy® relationship should be destaged to the physical source volume, e.g., source DASD. Further details of the FlashCopy® operations are described in U.S. Pat. No. 6,611,901 of Micka et al. and U.S. Pat. No. 7,000,145 of Werner, et al., which are incorporated herein by reference.

Once the logical relationship is established, hosts may then have immediate access to data on the source and target volumes, and the data may be copied as part of a background operation. A read to a track that is a target in a FlashCopy® relationship and not in cache triggers a stage intercept, which causes the source track corresponding to the requested target track to be staged to the target cache when the source track has not yet been copied over and before access is provided to the track from the target cache. This ensures that the target has the copy from the source that existed at the point-in-time of the FlashCopy® operation. Further, any destages to tracks on the source device that have not been copied over triggers a destage intercept, which causes the tracks on the source device to be copied to the target device.

Instant virtual copy techniques have been developed, at least in part, to quickly create a duplicate copy of data without interrupting or slowing foreground processes. Instant virtual copy techniques, such as a FlashCopy® operation, provide a point-in-time copy tool. Instant virtual copy techniques may be used for a variety of applications, including, for example, data backup, data migration, data mining, testing, etc. For example, an instant virtual copy technique may be used for the creation of a physical "backup" copy of the source data, to aid in disaster recovery.

In many applications there is a need to create and save multiple read-only snapshots of storage data. These snapshots represent versions of the storage data and each version should be accessed independently.

There is a need to provide efficient methods, systems and computer program products for managing data versions.

SUMMARY OF THE PRESENT INVENTION

In accordance with one aspect of the present invention a method for managing data versions is provided. The method includes: (i) receiving a first request to generate a first version of a source volume; (ii) selectively updating a first control data structure that is indicative of changes of blocks of data associated with different versions of the source volume, in response to the first request, to reflect at least one latest modified block of data that was modified between a first point in time associated with the first version and between second point in time associated with a second version of the first source volume; wherein information representative of different versions of the source volume are stored in a target storage unit; and wherein blocks of data that remain unchanged between multiple versions of the source volume are shared between these multiple versions; wherein the first point in time follows the second point in time and wherein the at least one block data belongs to the volume; and (iii) selectively copying blocks of data from the source volume to the target volume in response to the content of the first control data structure.

In one embodiment the selectively updating the first control data structure, in response to the first request includes updating the control data structure to reflect blocks of data that are not stored in the target storage unit but should be copied to the target storage unit.

In another embodiment the first control data structure includes a B-Tree per volume that is keyed by a key that includes a data block identifier and a requested point in time.

In yet another embodiment the stage of selectively updating the first control data structure in response to the first request, includes generating an empty entry in the B-Tree. This empty entry may be filled when the corresponding block of data is copied to the target storage unit.

In one embodiment the method further includes receiving a request to retrieve a requested version of the volume and copying, to the target storage unit at least one block of data that belongs to the requested version if (i) the at least one block of data was not copied to the storage target unit and (ii) the at least one block of data was modified between a point in time associated with the requested version and a point in time associated with at least one previous versions.

In another embodiment establishing a new version includes establishing an incremental flash copy relation on the source and the copying is done using flash copy services.

In one embodiment the method further includes updating entries of at least one control data structure in a lazy manner.

In another embodiment the method further includes maintaining a third control data structure indicative of oldest version of blocks of data that are not copied to the target storage unit. The third control data structure may be indicative of blocks of data the belong to multiple versions.

In yet another embodiment the method further includes maintaining a third control data structure indicative of oldest version of blocks of data that are not copied to the target storage unit and maintaining a fourth control data structure indicative of second oldest version of blocks of data that are not stored in the target storage unit. The third and fourth control data structures may facilitate a direct access to their entries.

In one embodiment the method further includes maintaining a sixth data structure indicative of most updated versions of blocks of data that were successfully copied to the target volume.

In accordance with a second aspect of the present invention a computer program product comprising a computer usable medium including a computer readable program is provided. The computer readable program when executed on a computer may cause the computer to: receive a first request to generate a first version of a source volume; selectively update a first control data structure that is indicative of changes of blocks of data associated with different versions of the source volume, in response to the first request, to reflect at least one latest modified block of data that was modified between a first point in time associated with the first version and between second point in time associated with a second version of the first source volume; wherein information representative of different versions of the source volume are stored in a target storage unit; and to selectively copy blocks of data from the source volume to the target volume in response to the content of the first control data structure; wherein blocks of data that remain unchanged between multiple versions of the source volume are shared between these multiple versions; wherein the first point in time follows the second point in time and wherein the at least one block data belongs to the volume.

In accordance with a third aspect of the present invention a storage controller comprising a system memory, a source cache and a target cache is provided. The storage controller may be adapted to be coupled to a source target unit and to a target storage unit; wherein the storage controller is adapted to: receive a first request to generate a first version of a source volume; selectively update a first control data structure that is indicative of changes of blocks of data associated with different versions of the source volume, in response to the first request, to reflect at least one latest modified block of data that was modified between a first point in time associated with the first version and between second point in time associated with a second version of the first source volume; and to selectively copy blocks of data from the source volume to the target volume in response to the content of the first control data structure; wherein information representative of different versions of the source volume are stored in the target storage unit; and wherein blocks of data that remain unchanged between multiple versions of the source volume are shared between these multiple versions; wherein the first point in time follows the second point in time and wherein the at least one block data belongs to the volume.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
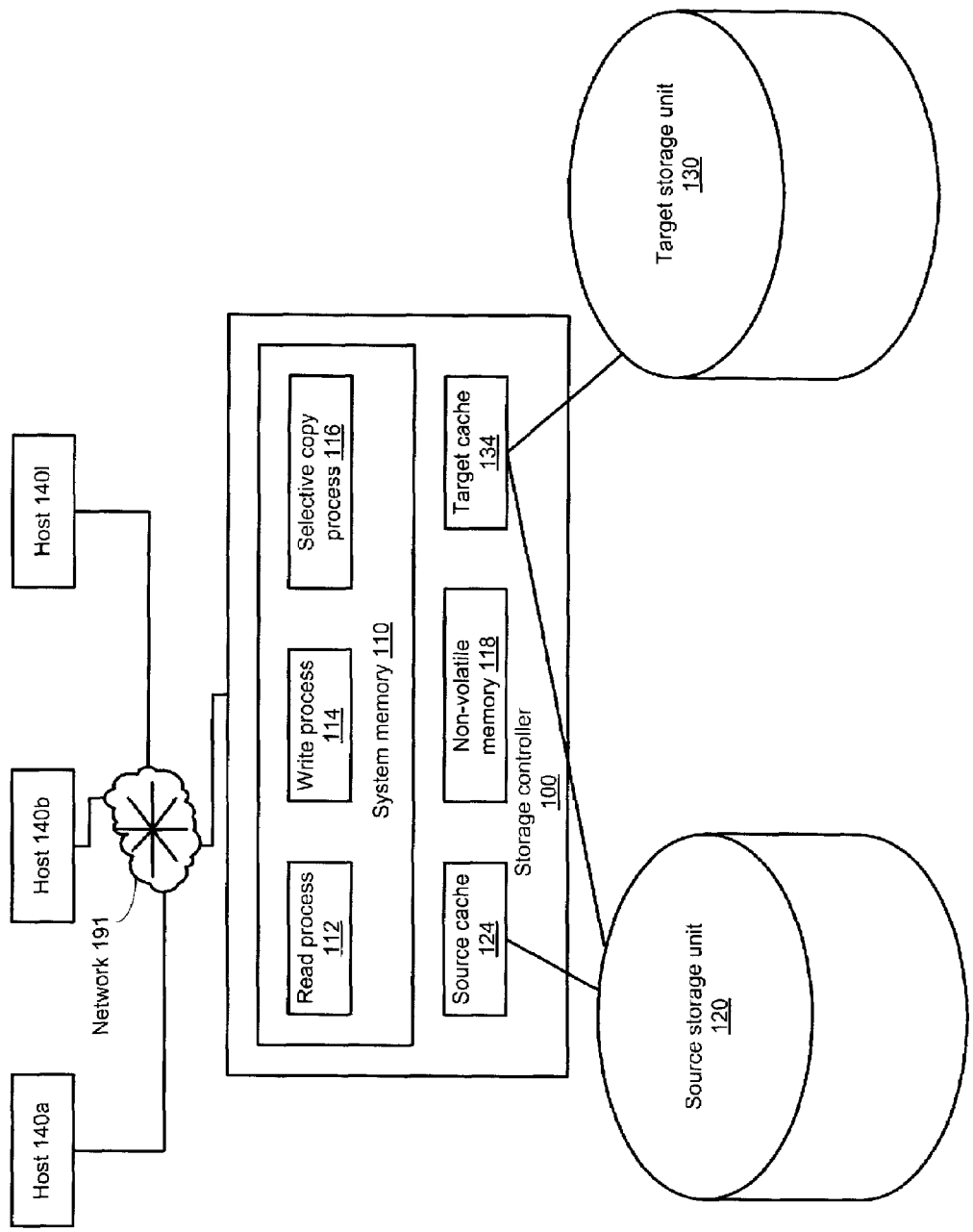
FIG. 1 illustrates a storage controller and its environment, according to an embodiment of the invention.

In the following description, reference is made to the accompanying drawings which form a part hereof and which illustrate several implementations of the present invention. It is understood that other implementations may be utilized and structural and operational changes may be made without departing from the scope of the present invention.

The invention provides a method, system and computer program product for storing and retrieving multiple versions of data. Data is arranged in volumes that include multiple blocks of data such as but not limited to tracks. For convenience of explanation some portions of the following description shall refer to tracks.

A source storage unit and a target storage unit may store various volume versions. Conveniently, blocks of data are selectively transferred from the source storage unit to the target storage unit. At least one control data structure is used for accessing different volume versions stored in the target data structure.

Conveniently, once a request to generate a new version is received a new empty control entry for a block within a first control data structure can be generated. It will be generated if the block of data should be protected at the source as result of the request; namely, should be copied to the target storage unit if read on the target or if it is going to be overwritten at the source storage unit. In other words, a block of data on the source storage unit may be required at the target, but it is not yet copied and stored there. At this stage a physical track is not yet allocated. If an empty control entry is generated then it can be filled once a corresponding block of data is transferred from the source storage unit to the target storage unit.

Conveniently, a certain version of a block of data is retrieved by using a key that includes a requested block of data identifier and a requested version sequence number or a requested timestamp. The retrieval includes searching for the latest changed target block of data (corresponding to the requested block of data identifier) that was changed before the requested version sequence number. It is noted that usually a version number requires less space.

Conveniently, the amount of empty control entries per block of data at any given point of time is responsive to the number of storage entities that still need to be protected (not be overwritten before a copy is sent to the target) at the source.

For example, if the source storage unit is preceded by a source cache then two different updated versions of a certain block of data can be stored within the source cache and within the source storage unit. Accordingly, up to two empty control entries can exist at any given point of time in order to protect these data versions. Once an even newer version of that block of data arrives at the source, one of the stored data versions on the source must be overwritten. If it is protected then prior to being overwritten it is transferred to the target storage unit and the corresponding previous empty control entry is filled. Another empty control entry may be generated in response to initiation of a new requested version.

Conveniently, all versions of a volume are stored in an enhanced Space Efficient target volume and the control data structure is a B-tree data structure. The requested volume identifier points to a root of a B-tree while the requested block of data identifier and timestamp (or version sequence number) are used to search the branches of that B-Tree.

Conveniently, each block of data is copied from the source storage unit to the target storage unit at most once per change. The timing of the copying process from the source storage unit to the target storage unit is responsive to: (i) changes in the block of data between the generation of different volume versions; (ii) requests to generate volume versions; (iii) number of storage entities that precede the target storage unit; (iv) requests to read a volume version that was not copied yet to the target storage unit.

Conveniently, the total meta-data space consumed at the target storage unit is proportional to a size of an initial version of the volume plus sum over all versions of the number of blocks of data changed from the previous version, while the total data storage space is proportional to sum over all version of the number of blocks of data changed from the previous version.

Conveniently, second data structure such as a FlashCopy® change recording (CR) map is used to determine which blocks of data were changed between the generation of consecutive volume versions. This change recording map can have a bit per block of data that is set if a corresponding block of data was modified between points in time associated with different versions. The bit is reset once that block of data is copied to the target storage unit.

Conveniently, not every modification of a block of data should be sent to the target storage unit. A block of data version should be sent to the target storage unit if it represents the latest modification of the block of data prior to a point in time associated with a volume version. For example, if between two points in time associated with two volume versions the block of data was modified several times than only the latest modification should be copied to the target storage unit.

Conveniently, a third control data structure is maintained. This third control data structure indicative of oldest version of blocks of data that should be copied to the target storage unit.

Conveniently, a fourth control data structure is maintained. This fourth control data structure is indicative of second oldest version of blocks of data that are not stored in the target storage unit.

According to an embodiment of the invention the third and fourth control data structures facilitate a direct access to their entries. Their entries can store relevant version numbers and the length (number of bits) of each entry is logarithmic in the number of versions.

FIG. 1 illustrates storage controller 100 and its environment, according to an embodiment of the invention.

Storage controller 100 receives Input/Output (I/O) requests from hosts 140a,b, . . . l (wherein a,b, and l may be any integer value) over a network 191 directed toward storage devices 120, 130 configured to have volumes (e.g., Logical Unit Numbers, Logical Devices, etc.). In certain implementations, the size of the target storage unit 130 may be larger than or equal to the source storage unit 120.

Source storage unit 120 includes one or more volumes which may be divided into blocks of storage containing blocks of data, and the blocks of storage are further divided into sub-blocks of storage that contain sub-blocks of data. A volume may be any logical or physical element of storage. In certain implementations, the blocks of data are contents of tracks, while the sub-blocks of data are contents of sectors of tracks.

Target storage unit 130 maintains multiple blocks of data representative of various source volume versions. For ease of reference, the terms tracks and sectors will be used herein as examples of blocks of data and sub-blocks of data, but use of these terms is not meant to limit implementations of the invention to tracks and sectors. The implementations of the invention are applicable to any type of storage, block of storage or block of data divided in any manner. Moreover, although implementations of the invention refer to blocks of data, alternate implementations of the invention are applicable to sub-blocks of data.

Storage controller 100 includes a source cache 124 in which updates to tracks in the source storage unit 120 are maintained until written to source storage unit 120 (i.e., the tracks are destaged to physical storage). The storage controller 100 includes a target cache 134 in which updates to tracks in the target storage unit 130 are maintained until written to target storage unit 130 (i.e., the tracks are destaged to physical storage). The source cache 124 and target cache 134 may include separate memory devices or different sections of a same memory device. Source cache 124 and target cache 134 are used to buffer read and write data being transmitted between the hosts 140a,b . . . l, source storage unit 120, and target storage unit 130. Further, although caches 124 and 134 are referred to as source and target caches, respectively, for holding source or target blocks of data in a point-in-time copy relationship, the caches 124 and 134 may store at the same time source and target blocks of data in different point-in-copy relationships.

Additionally, the storage controller 100 includes a non-volatile memory 118. The non-volatile memory 118 may be, for example, a battery-backed up volatile memory, to maintain a non-volatile copy of data updates.

Storage controller 100 further includes system memory 110, which may be implemented in volatile and/or non-volatile devices. System memory 110 includes a read process 112 for reading data, a write process 114 for writing data, and a selective copy process 116. Read process 112 executes in system memory 110 to read data from storages 120 and 130 to caches 124 and 134, respectively. The write process 114 executes in system memory 110 to write data from caches 124 and 134 to storages 120 and 130, respectively. The selective copy process 116 executes in system memory 110 to perform a selective copy operation that transfers data from source storage unit 120 to target storage unit 130.

Implementations of the invention are applicable to the transfer of data between any two storage mediums, which for ease of reference will be referred to herein as source storage unit and target storage unit or as first storage and second storage. For example, certain implementations of the invention may be used with two storage mediums located at a single storage controller, as illustrated in FIG. 1. Moreover, certain alternative implementations of the invention may be used with two storage mediums located at different storage controllers, different physical sites, etc. Also, for ease of reference, a block of data in source storage unit will be referred to as a "source block of data," and a block of data in target storage unit will be referred to as a "target block of data." When the indication of which storage is source storage unit and which storage is target storage unit is reversed, for ease of reference, the original "source block of data" will be referred to as the "new target block of data," and the original "target block of data" will be referred to as the "new source block of data."

In certain implementations, a removable storage (instead of or in addition to target storage unit 130) may be used to maintain some copies of all or a subset of the source storage unit 120, and the implementations of the invention transfer data to the removable storage rather than to the target storage unit. The removable storage may reside at the storage controller 100.

Storage controller 100 may further include a processor complex (not shown) and may comprise any storage controller or server known in the art, such as an Enterprise Storage Server® (ESS) 3990 Storage Controller (Enterprise Storage Server is a registered trademark of International Business Machines, Corp. or "IBM"), etc. The hosts 140a,b . . . l may include any computing device known in the art, such as a server, mainframe, workstation, personal computer, hand held computer, laptop telephony device, network appliance, etc. Storage controller 100 and host system(s) 140a,b . . . l communicate via a network 190, which may comprise a Storage Area Network (SAN), a Source Area Network (LAN), Wide Area Network (WAN), the Internet, an Intranet, etc. Source storage unit 120 and target storage unit 130 may each include an array of storage devices, such as Direct Access Storage Devices (DASDs), Just a Bunch of Disks (JBOD), Redundant Array of Independent Disks (RAID), virtualization device, etc.

Additionally, although FIG. 1 illustrates a single storage controller, one skilled in the art would know that multiple storage controllers may be connected via a network (e.g., a Source Area Network (LAN), Wide Area Network (WAN), the Internet, etc.), and one or more of the multiple storage controllers may implement the invention.

When host 140 wishes to update a block of data in source storage unit 120, host 140 writes data to a block of storage in source cache 124. Write operations modify the block of storage in source cache 124 synchronously (i.e., writing host 140 waits for the operation to complete), and then, in a background process, source cache 124 content is written to source storage unit 120. A write operation may update data, write new data, or write the same data again. Writing data in source cache 124 to source storage unit 120 is called a destage operation. Copying all or a portion of a block of data from source storage unit 120 to source cache 124 is a staging operation. Likewise, data may be staged and destaged between target storage unit 130 and target cache 134. Moreover, data may be staged from source storage unit 120 to target cache 134.

Figure 2:
FIG. 2 illustrates multiple control data structures according to an embodiment of the invention.

FIG. 2 illustrates multiple control data structures 190-199 according to an embodiment of the invention.

First control data structure 190 stores information representative of blocks of data that should be copied to the target storage unit as well as blocks of data that are stored at the target storage unit. The first control data structure indicates, for each block of data stored in the target storage unit, a version number (or timestamp), corresponding to the version during which the block of data changed. In addition, the first control data structure includes empty entries that represent blocks of data for versions that are still not copied from the source storage unit and stored there (either on disk or in cache). A block of data stored in the target storage unit is represented by a block of data identifier, a (possibly empty) reference to the data on the target disk, and a timestamp (or version serial number) representative of a volume version point in time associated with a change in the content of that block of data. The first control data is further illustrated in the following figures. It is noted that meta-date stored in first control metadata 190 is shared between versions. As illustrated in the following figures, there are no duplication of metadata if the block of data remained unchanged.

Conveniently, the source volume includes updated data while the target volume includes data of older versions. Data within a target volume is shared between versions. Conveniently, only modified data is copied for a new version while unmodified data is logically associated with the new version.

Second control data structure 192 is a change recording bit map. The second data structure is used to determine which blocks of data were changed between the generations of volume versions. This second control data structure 192 can have a bit per block of data that is set if a corresponding block of data was modified between points in time associated with different versions. The bit is reset once that block of data is copied to the target storage unit.

Third data structure 194 is indicative of oldest version of blocks of data that should be copied to the target storage unit.

Fourth data structure 196 is indicative of second oldest version of blocks of data that are not stored in the target storage unit.

Fifth control data structure 198 indicates the remaining number of blocks of data that should be copied during a copy process. It is initially set to a number of set bits in a change recording map of associated with a volume and is decremented when a single block of data is copied to the target storage unit.

Sixth control data structure 199 is indicative of most updated versions of blocks of data that were successfully copied to the target volume. Sixth control data structure 199 allows an efficient response to revert operations.

Figure 3:
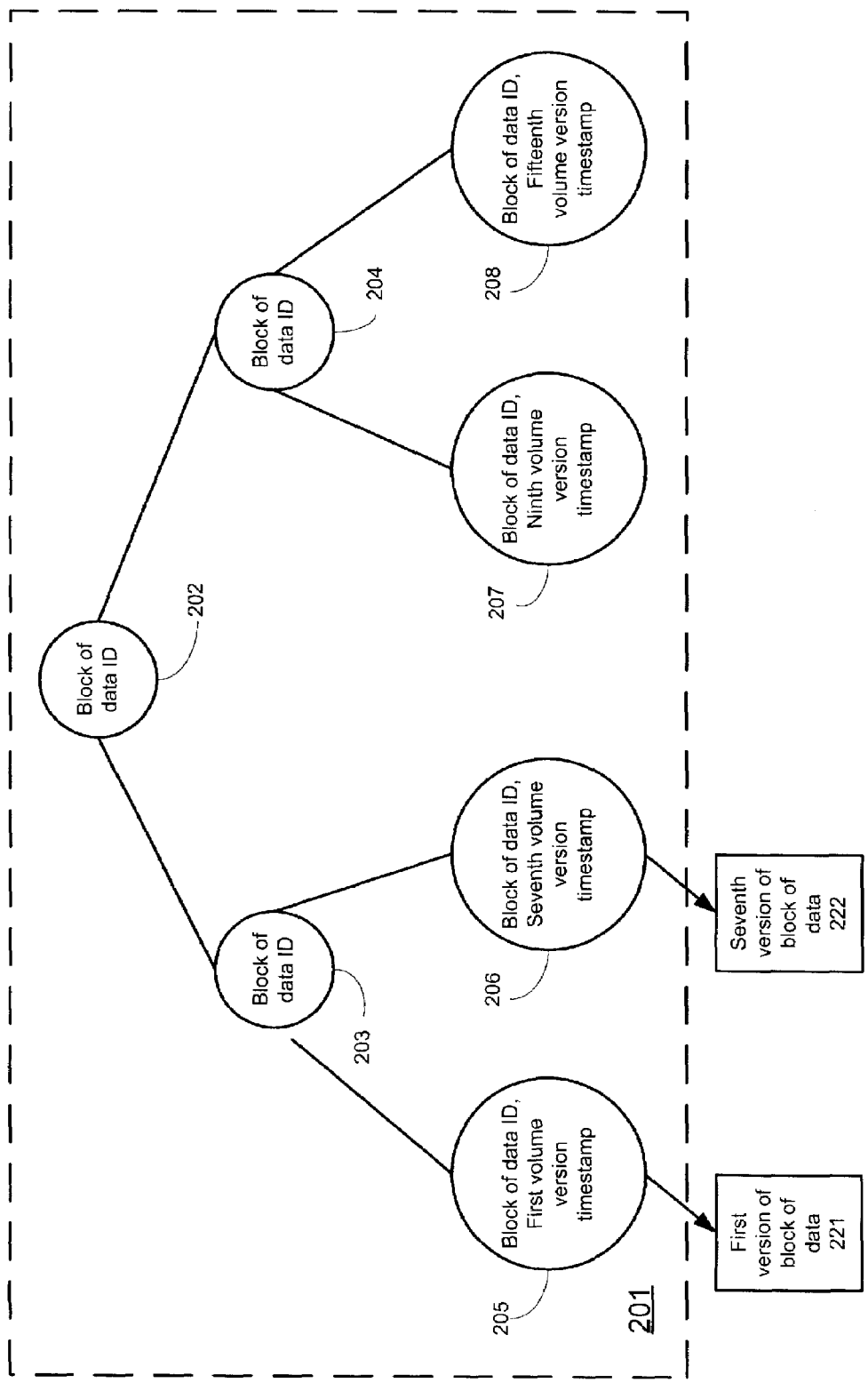
FIGS. 3-4 illustrate a portion of a first control data structure at various points in time, according to an embodiment of the invention.
Figure 4:
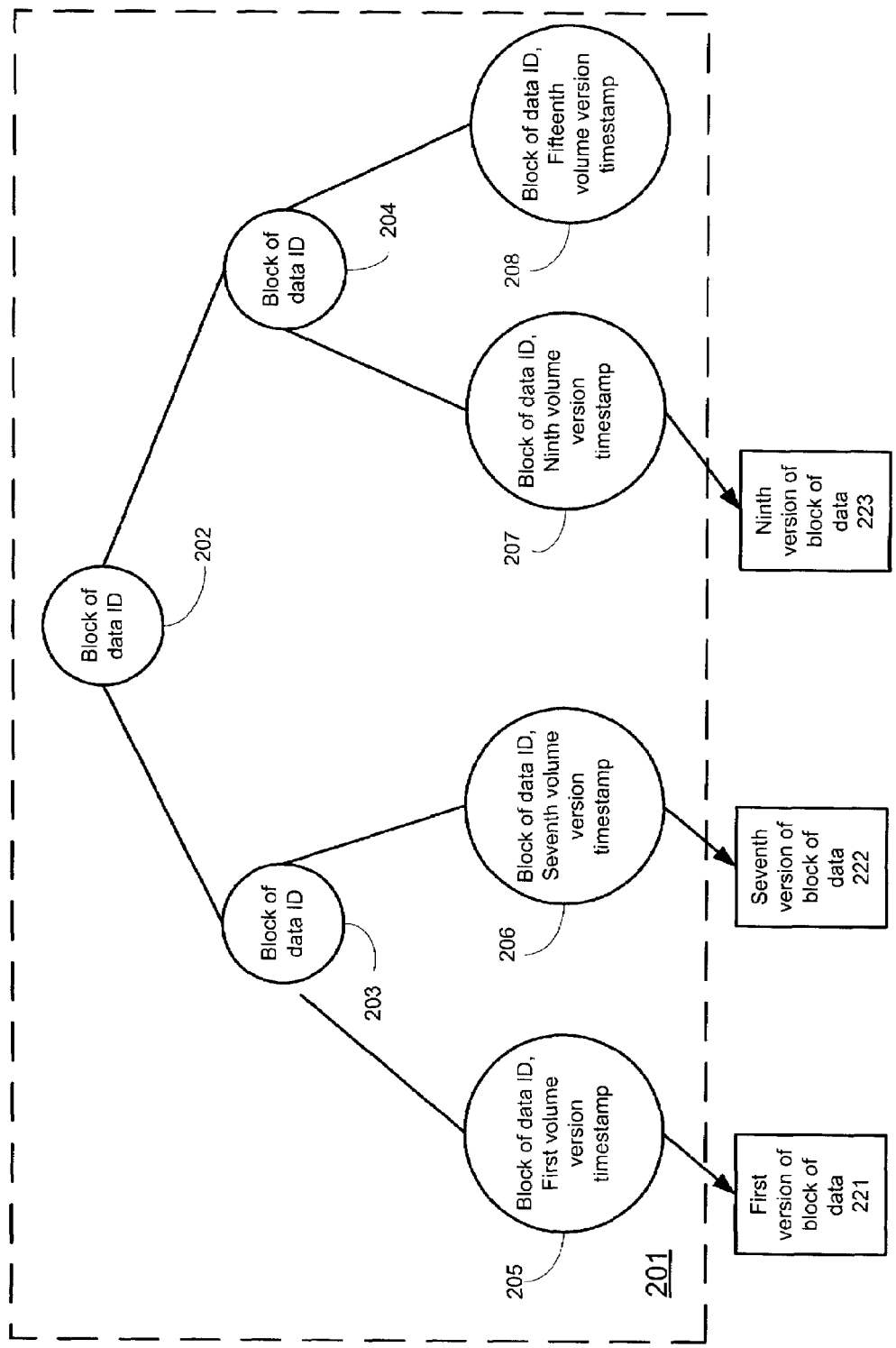

FIGS. 3-4 illustrate a portion 201 of first control data structure 190 at various points in time, according to an embodiment of the invention.

Portion 201 stores information representative of volume version related updates in a certain block of data. Each leaf node of portion 201 is characterized by an identifier that identifies that certain block of data and a version timestamp indicating a point in time associated with volume version related updates of that block of data.

For example, portion 201 includes four leaf nodes 205, 206, 207 and 208. Leaf nodes 205-206 include timestamps indicating that the certain block of data was updated in association with the first and seventh versions of a volume that includes that certain block of data. Leaf nodes 205-206 include pointers to the first and seventh version of the block of data 221 and 222. It is noted that the second till sixth versions of the block of data (associated with the second till sixth volume versions) equal the first version of the block of data thus they are not copied to the target storage unit and in addition the first control data structure 192 does not include entries that represent these versions.

Third and fourth leafs 207-208 do not point to a block of data, as the ninth and fifteenth versions of that block of data are stored at source cache 124 and at source storage unit 120 accordingly. Third leaf 207 indicates that a ninth version of the block of data should be eventually copied to the target storage unit 130. For instance, fourth leaf 208 is initially a blank entry. It indicates that a fifteenth version of the block of data should be eventually copied to the target storage unit 130. Fourth leaf 208 is currently empty—it does not point to the fifteenth version of the block of data. It will be filled when the fifteenth version of the block of data will be copied to target storage unit 130.

FIG. 4 illustrates another point in time, after the ninth version of the block of data is copied to target storage unit 130. Accordingly, leaf node 207 points to the ninth version of the block of data.

Figure 5:
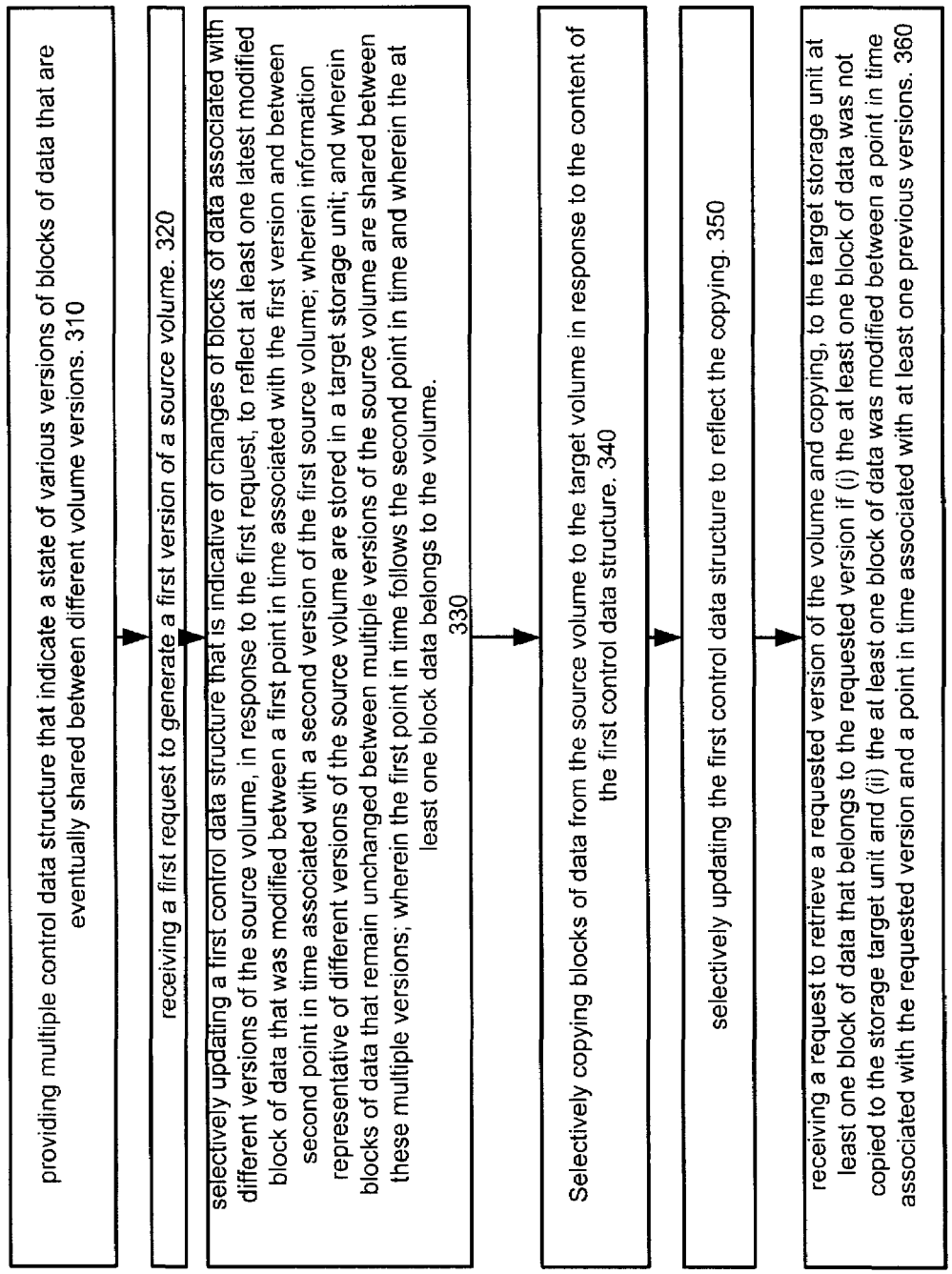
FIG. 5 illustrates a method for managing data versions, according to an embodiment of the invention.

FIG. 5 illustrates a method 300 for managing data versions, according to an embodiment of the invention.

Method 300 starts by stage 310 of providing multiple control data structure that indicate a state of various versions of blocks of data that are eventually shared between different volume versions. Stage 310 can include maintaining multiple data structures such as first till sixth control data structures 190-199.

Conveniently, stage 310 includes maintaining a first control data structure that is indicative of changes between versions of blocks of data while sharing meta-data relating to versions during which the block of data was not modified, and includes at least one empty entry indicative of new version blocks of data that should be copied to the target data structure.

Referring to the example, set forth in FIG. 3, leaf nodes 205-206 include pointers to the first and seventh version of the block of data 221 and 222 while leaf nodes 207 and 208 indicate that the ninth and fifteenth versions of this block of data should be stored at the target data unit although these versions are not yet stored at the target storage unit.

Stage 310 is followed by stage 320 of receiving a first request to generate a first version of a source volume. It is assumed that this first version differs from the initial version of the volume, although this is not necessarily so.

Stage 320 is followed by stage 330 of selectively updating a first control data structure that is indicative of changes of blocks of data associated with different versions of the source volume, in response to the first request, to reflect at least one latest modified block of data that was modified between a first point in time associated with the first version and between second point in time associated with a second version of the first source volume. Information representative of different versions of the source volume are stored in a target storage unit. Blocks of data that remain unchanged between multiple versions of the source volume are shared between these multiple versions. The first point in time follows the second point in time and the at least one block data belongs to the volume.

If a certain block of data was modified several times between the first and second point in time than only the latest version of that block of data (the latest changed block of data) will be eventually sent to the target storage unit.

It is noted that the first control data structure or any other meta-data can be updated in a lazy fashion (similar to a Flash copy relationship establish operation)—that is, the empty meta-data Btree entries can be created asynchronously using a background process. The establish operation of a new version can complete without waiting. Conveniently, if a request comes to a block and the background process is not yet done then the request should wait until the empty entry is created.

Conveniently, stage 330 includes updating the first control data structure to reflect blocks of data that are stored in the target storage unit as well as at least one block of data that is not stored in the target storage unit but will be copied to the target storage unit in response to at least one request to generate a future version of the volume.

Conveniently, stage 330 includes updating a first control data structure that is a B-Tree that is keyed by a key that includes a data block identifier and a requested point in time.

Conveniently, stage 330 includes generating an empty entry in the B-Tree. This empty entry is filled when the corresponding block of data is copied to the target storage unit.

Stage 330 is followed by stage 340 of selectively copying blocks of data from the source volume to the target volume in response to the content of the first control data structure. Stage 340 can include copying, to the target storage unit, at least one block of data if that block of data is being overwritten on a source storage unit or if it is being read at the target storage unit.

Conveniently, stage 340 includes initiating an asynchronous copy process of an initial version of the volume the target storage unit and replacing the asynchronous copy process by a faster synchronous copy if a request to retrieve a block of data of the initial version is received before a completion of the asynchronous copy process.

Stage 340 can include staging the at least one block of data to a target cache and then destaging the block of data to the target storage unit.

Conveniently, stage 340 can include accessing (and updating) at least one control data structure out of second till fifth control data structures in order to determine which blocks of data to copy and when the copy process is completed.

Stage 340 is followed by stage 350 of selectively updating the first control data structure to reflect the copying.

Method 300 can also include stage 360 of receiving a request to retrieve a requested version of the volume and copying, to the target storage unit at least one block of data that belongs to the requested version if (i) the at least one block of data was not copied to the storage target unit and (ii) the at least one block of data was modified between a point in time associated with the requested version and a point in time associated with at least one previous versions. It is noted that stage 360 can follow any stage of stages 320-350, as requests to retrieve a requested version are not necessarily synchronized to requests to retrieve a requested version of a volume.

The inventors used FlashCopy® technology to implement the mentioned above method. Accordingly, stage 330 can include establishing a FlashCopy relationship, stage 340 can include copying (staging to target cache and destaging to target storage unit) the at least one block of data that was modified between the second point in time and the third point in time.

Conveniently, method 300 includes maintaining a sixth control data structure indicative of most updated versions of blocks of data that were successfully copied to the target volume. This sixth control data structure allows an efficient response to revert operations. For example, if a request to revert to the seventh version of a source volume is received then for each block of data for which the seventh or more version is already stored in the target volume (as indicated by the sixth control data structure) the seventh version should be copied from the target volume.

Conveniently, entries of the various data structures are created in a lazy manner. Thus, method 300 can include starting to create entries of at least one control data structure in a lazy manner and selectively increasing (in response to certain events such as if a data block is needed before the asynchronous task has completed its entry) the priority and the speed of a creation additional entries of the at least one control data structure.

During an establish of a new version an asynchronous task is started to create the control data structures entries for each relevant block of data and the establish operation returns immediately. If a data block is needed before the asynchronous task has completed its entry then the entry is synchronously created and removed from the asynchronous task.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

According to an embodiment of the invention data is written to a write-back cache, and current as well and previous versions of data are sent to one or more storage units such as disks, disk arrays, tapes and the like. The data storage policy helps to refresh the data as well as the metadata and also assists in determining whether to send a certain data version to the disk or not.

According to an embodiment of the invention a method for providing a service to a customer is provided. The method can include: receiving, over a network, a first request to generate a first version of a source volume; selectively updating a first control data structure that is indicative of changes of blocks of data associated with different versions of the source volume, in response to the first request, to reflect at least one latest modified block of data that was modified between a first point in time associated with the first version and between second point in time associated with a second version of the first source volume; wherein information representative of different versions of the source volume are stored in a target storage unit; and wherein blocks of data that remain unchanged between multiple versions of the source volume are shared between these multiple versions; wherein the first point in time follows the second point in time and wherein the at least one block data belongs to the volume; and selectively copying blocks of data from the source volume to the target volume in response to the content of the first control data structure; and providing, over the network, in response to a request to retrieve a requested version of the volume, the requested version of the volume.

Conveniently the method for providing a service over a network can include any stage of method 300.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for managing data versions, the method comprises:

receiving a first request to generate a first version of a source volume;

selectively updating a first control data structure that is indicative of changes of blocks of data associated with different versions of the source volume, in response to the first request, to reflect at least one latest modified block of data that was modified between a first point in time associated with the first version and a second point in time associated with a second version of the source volume, wherein information representative of different versions of the source volume is stored in a target storage unit, and wherein first ones of the blocks of data that remain unchanged in the different versions of the source volume are shared among the different versions;

selectively copying blocks of data from the different versions of the source volume to the target storage unit in response to a content of the first control data structure; and maintaining an additional control data structure indicative of oldest modified blocks of data of the different versions that have not been copied to the target storage unit.

2. The method according to claim 1 wherein the selectively updating the first control data structure, in response to the first request comprises updating the first control data structure to reflect blocks of data that are not stored in the target storage unit but should be copied to the target storage unit.

3. The method according to claim 1 wherein the first control data structure comprises a B-Tree per volume that is keyed by a key that comprises a data block identifier and a requested point in time.

4. The method according to claim 3 wherein the stage of selectively updating the first control data structure in response to the first request, comprises generating an empty entry in the B-Tree; wherein this empty entry is filled when the corresponding block of data is copied to the target storage unit.

5. The method according to claim 1 further comprising receiving a request to retrieve a requested version of the source volume and copying, to the target storage unit at least one block of data that belongs to the requested version if (i) the at least one block of data was not copied to the target storage unit and (ii) the at least one block of data was modified between a point in time associated with the requested version and a point in time associated with at least one previous version.

6. The method according to claim 1 wherein establishing a new version comprises establishing an incremental flash copy relation on the source and the copying is done using flash copy services.

7. The method according to claim 1 further comprising updating entries of at least one control data structure in a lazy manner.

8. The method according to claim 1 further comprising maintaining a further control data structure indicative of respective second oldest versions of second oldest modified blocks of data that have not been copied to the target storage unit; wherein the additional control data structure and the further control data structure facilitate a direct access to their entries.

9. The method according to claim 1 further comprising maintaining a sixth data structure indicative of most updated versions of blocks of data that were successfully copied to the target volume.

10. A computer program product comprising a computer readable medium, the medium being one of an electronic, magnetic, optical, electromagnetic, infrared, and semiconductor apparatus, the medium including a computer readable program, wherein the computer readable program when executed on a computer causes the computer to:

receive a first request to generate a first version of a source volume;

selectively update a first control data structure that is indicative of changes of blocks of data associated with different versions of the source volume, in response to the first request, to reflect at least one latest modified block of data that was modified between a first point in time associated with the first version and a second point in time associated with a second version of the source volume, wherein information representative of different versions of the source volume is stored in a target storage unit;

selectively copy blocks of data from the source volume to the target storage unit in response to a content of the first control data structure; wherein first ones of the blocks of data that remain unchanged in the different versions of the source volume are shared among the different versions; and maintain an additional control data structure indicative of oldest modified blocks of data of the different versions that have not been copied to the target storage unit.

11. The computer program product according to claim 10 wherein the computer readable program when executed on a computer causes the computer to update the first control data structure to reflect blocks of data that are stored in the target storage unit as well as at least one block of data that is not stored in the target storage unit but will be copied to the target storage unit in response to at least one request to generate a future version of the source volume.

12. The computer program product according to claim 10 wherein the computer readable program when executed on a computer causes the computer to selectively update a first control data structure that comprises a B-Tree per volume, wherein the B-Tree is keyed by a key that comprises a volume identifier and a requested point in time.

13. The computer program product according to claim 12 wherein the computer readable program when executed on a computer causes the computer to generate an empty entry in the B-Tree; wherein this empty entry is filled when the corresponding block of data is copied to the target storage unit.

14. The computer program product according to claim 10 wherein the computer readable program when executed on a computer causes the computer to receive a request to retrieve a requested version of the source volume and copy, to the target storage unit at least one block of data that belongs to the requested version if (i) the at least one block of data was not copied to the target storage unit and (ii) the at least one block of data was modified between a point in time associated with the requested version and a point in time associated with at least one previous versions.

15. The computer program product according to claim 10 wherein the computer readable program when executed on a computer causes the computer to establish an incremental flash copy relation on the source and to copy using flash copy services.

16. The computer program product according to claim 10 wherein the computer readable program when executed on a computer causes the computer to update entries of at least one control data structure in a lazy manner.

17. The computer program product according to claim 10 wherein the computer readable program when executed on the computer causes the computer to maintain a further control data structure indicative of second oldest modified blocks of data that have not been copied to the target storage unit; wherein the additional control data structure and the further control data structure facilitate a direct access to their entries.

18. The computer program product according to claim 10 wherein the computer readable program when executed on a computer causes the computer to maintain a sixth data structure indicative of most updated versions of blocks of data that were successfully copied to the target volume.

19. A storage controller comprising a system memory, a source cache and a target cache, wherein the storage controller is adapted to be coupled to a source storage unit and to a target storage unit; wherein the storage controller is adapted to:

receive a first request to generate a first version of a source volume;

selectively update a first control data structure that is indicative of changes of blocks of data associated with different versions of the source volume, in response to the first request, to reflect at least one latest modified block of data that was modified between a first point in time associated with the first version and a second point in time associated with a second version of the source volume;

selectively copy blocks of data from the source volume to the target storage unit in response to a content of the first control data structure; wherein information representative of the different versions of the source volume is stored in the target storage unit; and wherein first ones of the blocks of data that remain unchanged in the different versions of the source volume are shared among the different versions; and maintain an additional control data structure indicative of oldest modified blocks of data of the different versions that have not been copied to the target storage unit.

20. The storage controller according to claim 19 wherein the storage controller is adapted to update the first control data structure to reflect blocks of data that are not stored in the target storage unit but should be copied to the target storage unit.

21. The storage controller according to claim 19 further adapted to maintain further control data structure indicative of second oldest modified blocks of data that have not been copied to the target storage unit; wherein the additional control data structure and the further control data structure facilitate a direct access to their entries.

22. The storage controller according to claim 19 further adapted to maintain a sixth data structure indicative of most updated versions of blocks of data that were successfully copied to the target volume.

23. The storage controller according to claim 19 wherein the first control data structure comprises a B-Tree per volume that is keyed by a key that comprises a data block identifier and a requested point in time.

24. The storage controller according to claim 23 further adapted to generate an empty entry in the B-Tree; wherein this empty entry is filled when the corresponding block of data is copied to the target storage unit.

25. The storage controller according to claim 19 further adapted to receive a request to retrieve a requested version of the source volume and copy, to the target storage unit at least one block of data that belongs to the requested version if (i) the at least one block of data was not copied to the target storage unit and (ii) the at least one block of data was modified between a point in time associated with the requested version and a point in time associated with at least one previous versions.

26. The storage controller according to claim 19 further adapted to establish an incremental flash copy relation on the source and the copying is done using flash copy services.

27. The storage controller according to claim 19 further adapted to update entries of at least one control data structure in a lazy manner.

* * * * *